United States Patent [19]

Cecka et al.

[11] 4,061,520
[45] Dec. 6, 1977

[54] METHOD OF MAKING COMPOSITE HIGH STRENGTH TO WEIGHT STRUCTURE

[75] Inventors: Andrew M. Cecka, Covina; Pol Dano, Camarillo, both of Calif.

[73] Assignee: Fansteel Inc., North Chicago, Ill.

[21] Appl. No.: 720,514

[22] Filed: Sept. 3, 1976

Related U.S. Application Data

[60] Division of Ser. No. 633,300, Nov. 17, 1975, abandoned, which is a continuation of Ser. No. 442,204, Feb. 13, 1974, abandoned.

[51] Int. Cl.² ............................................. B29G 7/00
[52] U.S. Cl. .................................. 156/245; 264/45.1; 273/73 F
[58] Field of Search ............ 156/245; 264/45.1, 45.4, 264/46.4, 46.5, 46.6, 328; 273/73 R, 73 C, 73 G, 73 J, DIG. 23

[56] References Cited

U.S. PATENT DOCUMENTS

| | | | |
|---|---|---|---|
| 2,870,793 | 1/1959 | Bailey | 156/79 |
| 3,286,004 | 11/1966 | Hill et al. | 264/46.6 |
| 3,483,055 | 12/1969 | Eshbaugh | 273/73 F |
| 3,635,483 | 1/1972 | Barriball et al. | 273/73 F |
| 3,644,168 | 2/1972 | Bonk et al. | 273/73 F |
| 3,740,301 | 6/1973 | Manning et al. | 273/73 F |
| 3,787,051 | 1/1974 | Johns | 273/73 F |
| 3,856,603 | 12/1974 | Schaefer et al. | 156/245 |
| 3,873,654 | 3/1975 | Smith | 264/46.4 |
| 3,902,732 | 9/1975 | Fosha et al. | 273/73 F |
| 3,930,920 | 1/1976 | Kicherer | 156/191 |

FOREIGN PATENT DOCUMENTS

1,122,895  8/1968  United Kingdom .............. 273/73 F

*Primary Examiner*—Caleb Weston
*Attorney, Agent, or Firm*—Dressler, Goldsmith, Clement, Gordon & Shore, Ltd.

[57] ABSTRACT

A novel structural member, such as a tennis racket frame, having an unusually high strength to weight ratio is provided comprising an expanded foamed plastic core integrally bonded to a shell comprising at least one layer of resin coated unidirectionally oriented graphite fibers, the shell completely encasing the core at any transverse cross section of the structural member.

The structural member is prepared by arranging within a mold cavity an outer shell comprising at least one sheet of resin coated unidirectionally oriented graphite fibers and a core comprising a foamable resin composition, sealing the mold cavity and activating the foamable resin composition to cause expansion and generate pressure within the mold cavity and thereby provide intimate bonding of the core to the shell.

4 Claims, 5 Drawing Figures

METHOD OF MAKING COMPOSITE HIGH STRENGTH TO WEIGHT STRUCTURE

This is a division, of application Ser. No. 633,300, filed 11/17/75, abandoned, which is a con't of Ser. No. 442,204 filed 2/13/74, abandoned

BACKGROUND OF THE INVENTION

This invention relates to a lightweight, high strength and stiffness composite structure that provides superior performance for a wide variety of applications, especially in recreational products such as tennis racket frames, skis and hockey sticks, and in body protective equipment such as football helmets, motorcycle helmets, shin guards and shoulder pads. The invention also provides a method of making such a structure.

The outstanding characteristics and benefits that the structure of this invention offers over products of the prior art are especially described in this specification with reference to tennis rackets as an example. However, as will be readily apparent to those skilled in the art, the product and the method of this invention provide superior characteristics for many applications where a material is desired that possesses low weight combined with high strength, stiffness, torsional resistance, excellant stability and long endurance.

The earliest tennis rackets utilized frames of solid wood, but these were superseded by laminated wood construction, such as selected ash, maple and birch laminates, sometimes with built-in, steel-like fibers. While the laminated wood construction offers improvements over solid wood, it suffers disadvantages such as relatively low tensile and compressive strength, poor life and lack of uniformity. In addition, it is subject to warpage and scuffing, tends to lose color, loses stiffness and strength properties, has a relatively short fatigue life, offers high wind resistance in cross sections large enough to provide the needed strength, and is difficult to manufacture to uniform weight, balance, density and mechanical properties.

Tennis rackets with metal frames, such as tubular round, channel, I-beam extrusions and other configurations, have been constructed from alloy steel, magnesium, and especially aluminum. With the metal frames, there is a limit on weight to achieve the desired performance, and shock and vibration are transmitted to the player, especially on mis-hit shots, which contributes to player fatigue and to the "tennis elbow" injury. Objectionable sound transmission (sometimes rings) is another drawback of metallic frames. The metal frames also cause a trampoline effect. In addition, the grommets or eyelets used to guide the tennis string tend to crack prematurely.

Composite laminated fiber glass reinforced plastic tennis rackets have been produced by techniques such as injection molding, transfer molding, and compression molding. U.S. Pat. No. 3,483,055 to R. W. Eshbaugh describes a fiber glass construction for tennis racket frames in which the frames are made of alternating layers of resin-impregnated glass fibers and of absorbent paper. Such fiber glass tennis rackets are generally regarded as being too flexible and the desired rigidity cannot be obtained.

It is technically feasible to produce a similar composite structure using resin-impregnated graphite fibers in place of the glass fibers but such a structure still does not have the desired deflection characteristics.

A sandwich construction in tennis rackets, made by adhering glass fiber layers over both faces of a wooden racket frame results in improved service life, especially with regard to fatigue characteristics, but the tennis strings tend to loosen, dynamic response is lost, and there is a limitation on weight reduction.

An improved sandwich construction is obtained by adhering graphite fiber layers over a wooden frame, but such a construction still has the above-mentioned limitations of a wood core.

Sandwich constructions with cores other than wood also have been developed or investigated. These include a foamed plastic core with aluminum facing, and low density, preformed rigid plastic cores with aluminum, fiber glass or graphite fiber facings. These constructions suffer a number of disadvantages including creep and relaxation of tension on the strings. In the cases of metal facings, the mismatch in co-efficient of thermal expansion between the facing and core causes problems in fabrication and during use because of residual stresses.

Still another sandwich construction is described in U.S. Pat. No. 3,640,533 to T. B. Davis. This construction is comprised of a reinforcement mesh of metal covered on opposite sides by fiber glass reinforced resin, which is attached to the wood core of the racket. The metal mesh has a degrading effect on the composite due to the differences in elastic properties between the metal and the wood, and the system cannot be made as light as the composite structure of the instant invention and still achieve the same level of stiffness and resistance to fatigue.

Still another composite structure, useful in skis, is disclosed in U.S. Pat. No. 3,493,240 to H. R. Jenks. This structure comprises upper and lower skins of resin impregnated fiber glass sheets bonded to longitudinally extended channel members, which provide hollow cores. The construction is difficult to process, complex, and susceptible to a great number of variables in production. Further, leaks in the air bags (hollow cores) may not be known until the part is constructed. Further, the fiber glass facing does not provide the stiffness-to-strength ratio provided by this invention.

BRIEF SUMMARY OF THE INVENTION

In accordance with the present invention, the abovedescribed deficiencies in structural members for tennis rackets and other applications are overcome by providing an integrally bonded, light weight, strong and stable composite structure of high quality and playing characteristics, and specifically a composite structure comprised of an expanded core integrally bonded in a one-step molding process to a resin impregnated, high strength graphite fiber shell. The structure of this invention offers a wide versatility in design to meet a wide range of flexural and torsional characteristics, and to meet specific requirements not obtainable in any prior construction.

Specifically, the structural member of this invention comprises a core of an expanded cellular, or foamed, resinous material integrally bonded to a shell comprising at least one layer of resin coated unidirectionally oriented graphite fibers, said shell completely encasing said core at any cross section transverse to the length of said member. In preferred embodiments the shell comprises a plurality of layers of resin coated unidirectionally oriented graphite fibers and at least one of said layers has its fibers oriented in a direction different from the direction of orientation of the fibers in at least one other layer.

Preferably, the foamed plastic core is relatively light, ranging from about 20 to about 60 pounds per cubic foot and comprises from about 25 to about 80 percent of voids.

The structural member is prepared by arranging within a mold cavity an outer shell comprising at least one sheet of resin coated unidirectionally oriented graphite fibers and a core comprising a foamable resin composition, sealing the mold cavity and activating the foamable resin composition to cause expansion and generate pressure within the mold cavity and thereby provide intimate bonding of the core to the shell.

BRIEF DESCRIPTION OF THE DRAWINGS

The invention is best understood by reference to the drawings of which.

DETAILED DESCRIPTION

Figure 1:
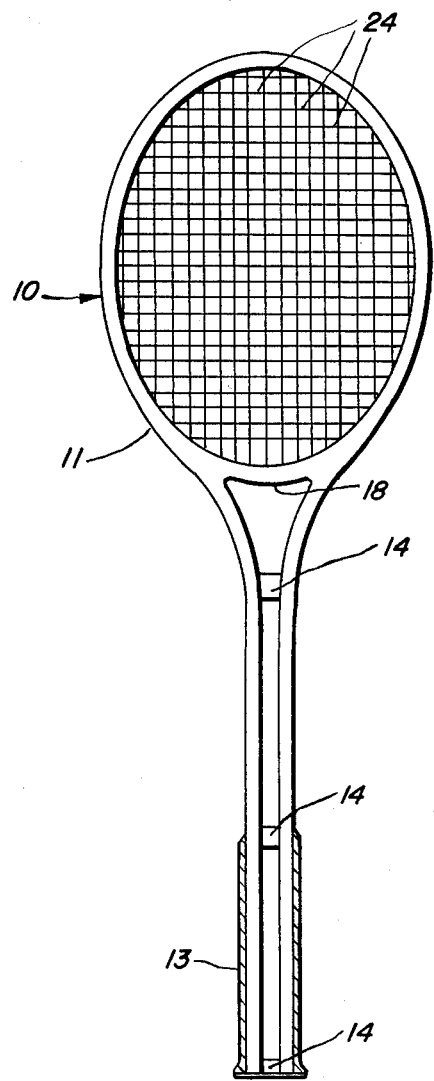
FIG. 1 is a front elevation of a tennis racket employing the composite structure of this invention, the grip being shown in section.

In the illustrated embodiment of the invention, tennis racket frame 10 comprises head section 11 and handle section 12 with grip 13 affixed to the lower portion of the handle section. In the handle section the frame comprises two spaced side-by-side portions connected to each other by cross braces 14. The two portions of the handle separate to a greater distance from each other where the handle joins the head section so that the major portion of the ellipsoid shape of the head section comprises a smooth extension of the portions of the handle section. Short segment 18 completes the ellipsoid of the head portion.

Figure 2:
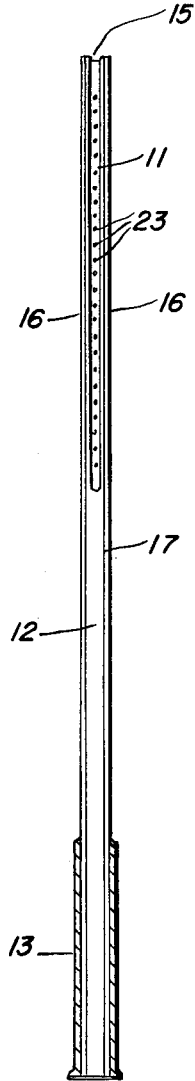
FIG. 2 is a side elevation of a tennis racket of this invention, the grip again being shown in section.
Figure 5:
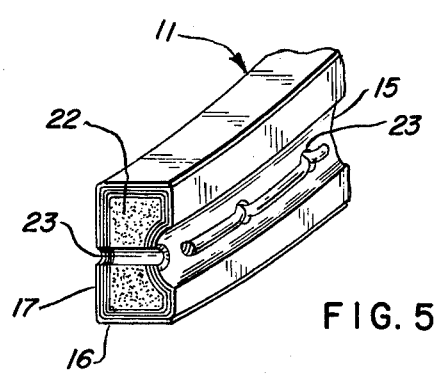
FIG. 5 is an enlarged cross section, shown in perspective, showing the details of the recessed groove and holes used for the strings in the frame of a tennis racket employing the composite structure of this invention.

Head section 10, as shown in FIGS. 2 and 5 has a peripheral recessed groove 15, and a plurality of holes 23 through which strings 24 are attached.

Figure 3:
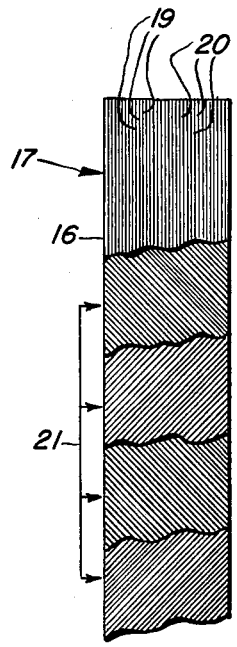
FIG. 3 is an enlarged detail view of a portion of the resin coated, oriented graphite fiber structure used in the shell of the composite structure of this invention, with successive layers serially exposed.
Figure 4:
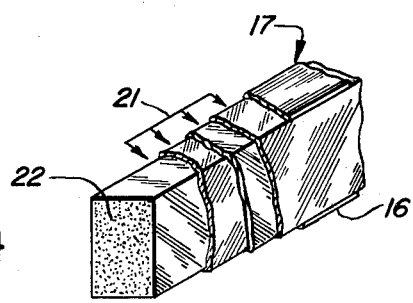
FIG. 4 is an enlarged cross section, shown in perspective, showing the integrally bonded composite structure of this invention, with successive layers serially exposed.

The composite structure of the frame, as shown in FIGS. 4 and 5, comprises foamed plastic core 22, surrounded by shell 17 comprising a plurality of layers 21, each made of a sheet of graphite fibers, unidirectionally oriented and resin coated. As shown in FIGS. 3 and 4, each sheet of graphite fibers is arranged at 45° to the long dimension of the structural member, the sheets alternating between +45° and −45° and thus being at right angles to each other. Two opposite faces of the structural member, corresponding to opposite faces of the tennis racket are faced with a final external layer 16 of graphite fiber sheet with fibers 19 aligned along the long dimension of the structural member, the resin-filled spaces between the fibers being shown as 20.

The composite structure of this invention is made in a self-bonding single-step molding process within a rigid mold capable of withstanding the internal forces caused by the pressure developed in the curing cycle. The mold is preferably constructed of tool steel which is chromium plated on its interior surfaces. For short runs the mold may be constructed of aluminum with anodized interior surfaces.

The graphite fiber sheets used in this invention are made by applying a resinous binder to a sheet of unidirectionally oriented graphite fibers. The resinous binder is applied in liquid state to the graphite fibers and fills the interstices between the fibers before achieving a rigidified state by cooling or curing. The resinous binder may be a thermoplastic material capable of withstanding the curing temperatures to be applied, but is preferably a thermosetting material. Useful thermoplastic materials include nylon, polyethylene, polypropylene, linear polyesters, polycarbonates and acetol resins. Useful thermosetting materials include phenolic resins, cross-linked polyesters, and epoxy resins, a specific example being a cyclized epoxy novolac.

The graphite fibers are preferably of medium modulus, ranging from about 30 million to about 40 million pounds per square inch. Where exceptionally high strength and stiffness are desired, graphite fibers of high modulus, ranging from about 50 million to about 60 million pounds per square inch may be used. Individual graphite filaments are generally of extremely fine diameters (of the order of about 0.0003 inches); and the graphite fibers used to make the graphite sheets generally comprise yarns containing hundreds, or thousands, of individual filaments, as is known in the art.

The core composition is suitably an extrudable composition having the approximate consistency of a firm putty, or of molding clay. Any of the compositions commercially sold as "intumescent" resinous compositions may be used. Such compositions are commercially used as materials for splicing and filling honeycomb cores used in sandwich constructions. The compositions generally comprise an uncured resin, together with a curing agent, a blowing agent, and usually a flow control material which also adds bulk and body at low weight.

The resin is typically an epoxy resin or a phenolic resin. The blowing agent is typically either a compound such as an azo, N-nitroso, carbonate, or sulfonyl hydrazide compound which decomposes when heated to yield nitrogen or carbon dioxide, or a volatile normally liquid material such a pentane, water or a liquid fluorocarbon. Preferred flow control materials include hollow glass or silica microspheres, hollow carbon or graphite microspheres and finely divided expanded vermiculite. Glass or asbestos fibers or mic flakes may also be used. And graphite whiskers may be used advantageously adding strength as well as bulk. Suitable intumescent resin compositions are known and commercially available and the nature of such compositions per se is not part of this invention.

Intumescent resin compositions may be formulated to any desired expansion ratio depending on the amount of blowing agent incorporated. Generally, expansion ratios from about 1.5 to about 5.0 are suitable, the preferred ratios being from about 1.5 to about 3.0.

In preparing the structural member of this invention, the foam composition is extruded to a core of cross section smaller than that of the final expanded core cross section. The core is then wrapped with a plurality of plies of resin impregnated unidirectional graphite fiber sheets, alternately cross-plied to each other. The wrapping may be manual or may be by the operation of a helical winding apparatus, such as the apparatus described in U.S. Pat. No. 3,479,402 to William B. Goldsworthy. The plies are preferably wrapped alternately at +45° and −45° to the long dimension of the core, and typically about four layers, are employed.

An additional layer of graphite sheet is laid into the bottom of the mold with its graphite fibers directed along the longitudinal direction of the mold. The wrapped core is formed to the shape of the mold running from one end of the handle up the handle, around the frame, and then down the handle to its end. A second short section of wrapped core is inserted in the mold and spliced to obtain a continuum of the composite structure to complete the closed ellipsoid shape of the head of the frame at the location where the handle sections separate from each other at the location where the handle joins the head.

Another layer of graphite sheet with graphite fibers directed along the longitudinal direction of the mold is then laid upon the wrapped core in the mold; and the mold is then closed and clamped and then heated to cure and expand the core composition. The clamping may be by a hydraulic press, by tie bars or high strength clamps; and the mold may be heated by hot platens on a hydraulic press or by insertion into an oven. The curing temperature is suitably in the range of about 150° to about 350° F. and the heating period is suitably from about ½ to about 1 hour, depending on the nature of the resin formulation and the nature of the curing agents.

The heat during the curing cycle activates the foaming agent in the core and causes the foam to expand. As the foam expands, it generates pressure within the confined mold cavity and causes intimate bonding of the core to itself and to the resin impregnated graphite fiber shell. It is to be understood that the transverse cross-sectional area of the mold cavity is less than would be the transverse cross-sectional area of the wound core material if it were permitted free expansion.

Bonding in this matter under internal pressure produces a composite with excellent structural integrity which exhibits no voids or soft spots. The wraparound of the core by the graphite sheets produces a structure in which the shell completely encases the core at any transverse cross section and thereby provides a box beam construction of exceptional strength and stiffness for its weight. During the expansion of the core material, the graphite sheets, which have only limited expandability, tend to unwind from the core to some extent but nevertheless completely encase it.

Upon completion of the curing cycle the mold is cooled and then opened; and the molded frame is removed.

Holes for the tennis strings may be drilled in the head but are preferably provided by removable pins inserted into the head portion of the wrapped core before the curing thereof in the mold.

Thereafter the balance of the frame is checked and adjusted, if necessary, by removing material of adding weights. The frame is then painted or coated with a scuff and abrasion resistant paint or film, applied by spraying, dipping, or bonding, followed by curing. The desired grip is then assembled or installed using either an adhesive or mechanical bond. After installation of the tennis strings, weights can be added, if desired, to achieve the desired balance and total weight of the racket.

The unique properties of the structure of this invention are obtained from the properties of the core, the properties of the shell, and most importantly from the properties obtained by the coaction of the core and the shell.

The core provides stability to the structure by firmly holding the shell in place. It also promotes high damping characteristics and thereby substantially reduces vibrations and shock, reduces the tendency toward fatigue failure, reduces stresses, and reduces buckling stress and any tendency toward failure by buckling. These desirable benefits are achieved with little added weight over the weight of a hollow shell structure.

The oriented graphite fiber structure in the shell possesses high strength to weight and stiffness to weight ratios. The use of varying amounts and kinds of graphite fibers in the shell and varying fiber orientations therein provides the ability to tailor the properties of the composite structure to obtain the desired flexural stiffness, torsional resistance, and balance. The graphite fiber shell also exhibits excellent resistance to creep and provides a high endurance life.

The composite structure produced by the coaction of the oriented graphite fiber shell and the light weight core is of light weight for its strength and stiffness and permits better weight distribution in a specialty product, such as a tennis racket, by permitting the addition of weight to the preferred areas of the structure. In a tennis racket, this feature of the novel composite structure greatly improves the control and playability characteristics.

The composite structure also exhibits minimal dimensional changes with temperature, resulting in excellent stability and constant string tension and thereby providing uniform playing characteristics under a wide range of environmental conditions.

The method of manufacture of the composite structure of this invention permits a wide versatility in design of specific products to meet a wide range of flexural and torsional characteristics.

In a tennis racket, the composite structure of this invention provides properties which result in the racket having a large "sweet spot" which permits excellent playability and control even when the tennis ball is not hit dead center on the racket. The enlarged areas of the "sweet spot" in tennis racket frames using the composite structure of this invention provides overall superior playing characteristics when compared to any prior art construction.

Tennis racket frame constructions are tested objectively in several ways including static non-destructive tests, static destruction or crush tests and dynamic tests, as well as subjectively by player evaluation. Static tests include evaluation of deflections under static loads to determine frame stiffness in flexure, torsion and head distortion. Dynamic testing subjects the tennis racket to a series of impacts, sometimes called "whacks" to simulate thousands of service hits on tennis balls.

In all of the above-described tests the structure of this invention achieves the desired level of performance at a lower weight than are achieved in prior art constructions. For example, a racket with grips and strings, prepared in accordance with this invention and weighing between 11½ and 12½ ounces will meet or better the test values obtained on a conventional wood or metal racket weighing between 13⅝ and 14⅝ ounces.

The method of this invention has been described with reference to a preferred procedure. It is to be understood, however, that variations may be used. For example, the graphite fiber layers, or a portion of them, may be lined on the interior surfaces of the mold instead of being wrapped around the core.

Also, if the graphite layers lining the surfaces of the mold cavity are adequately sealed, the foamable resin composition may be put into the cavity in liquid, or fluent, form rather than as a preformed structure. One suitable composition of this type is a freshly mixed self-foamable composition, such as a freshly prepared mixture of the polyol and polyisocyanate components of a rigid polyurethane foam. In this case, the pressure on the interior of the mold is generated, at least in part, by the normal foaming action of the self-foaming composition.

Another suitable fluent composition is a composition containing a thermoplastic resin and a blowing agent which is introduced into the mold by injection under pressure. Suitable compositions of this type are disclosed in U.S. Pat. No. 3,436,446 to Richard G. Angell, Jr., and in U.S. Pat. No. 3,268,636 to the same inventor. In this case, at least a portion of the pressure on the interior of the mold is the injection pressure which forces the composition into the mold and to the extremities thereof.

The product of this invention has been described with particular reference to a tennis racket, but it will be understood by those skilled in the art that the principles of this invention are applicable to other products in which strength and rigidity are desired at minimum weight. Such products include skis, hockey sticks, archery bows, and head and body protection structures, such as helmets, and shoulder and shin guards. The structure of this invention is also useful for golf club shafts as a replacement for the hollow center graphite shafts now in use for those golfers who prefer added stiffness in their clubs.

Other variations and modifications will be apparent to those skilled in the art.

What is claimed is:

1. A method of producing a tennis racket frame of high strength to weight ratio comprising providing a mold cavity shaped in the form of a tennis racket frame having oppositely disposed faces and having a handle with a grip at one end and a head of ellipsoid shape attached to the other end, the handle grip of said mold cavity having two substantially parallel cavity portions corresponding to two sides of said handle, forming an elongated core of uniform cross section from a foamable resin composition having the consistency of a firm putty, having an expansion ratio from about 1.5 to about 5.0 and comprising an uncured resin, a curing agent and a blowing agent, wrapping said core with a plurality of layers of unidirectionally oriented resin coated graphite fibers, each of said layers having its fibers oriented at an angle to the direction of said core, at least one of said layers having its fibers oriented in a direction different from the direction of orientation of the fibers in at least one other of said layers, arranging said wrapped core within said mold cavity with both ends of said wrapped core at the grip end of said mold, said wrapped core extending from one of its ends at the grip end of said mold cavity, up one of said substantially parallel cavity portions in the handle portion of said mold cavity, around a major portion of the head portion of said mold cavity and down the other substantially parallel cavity portion in the handle portion of said mold cavity to terminate at the grip end of said mold cavity, arranging an additional layer of graphite fibers on each of said oppositely disposed faces of said frame along the direction of said core, therafter sealing said mold cavity, heating said foamable resin composition to cause expansion thereof and generate pressure within said mold cavity pressing said core against said layers of graphite fibers, and thereafter removing said expanded wrapped core as an integral composite tennis racket frame, said mold cavity being of smaller cross-sectional area than the cross-sectional area of said core would be if said core were permitted free expansion.

2. The method of claim 1, wherein said foamable resin composition has an expansion ratio from about 1.5 to about 3.0.

3. The method of claim 1 wherein said wrapped layers alternate in direction of orientation from about +45° to about −45° to the direction of the long dimension of said core.

4. The method of claim 1 wherein said foamable resin composition contains a flow control material.

* * * * *

UNITED STATES PATENT AND TRADEMARK OFFICE
CERTIFICATE OF CORRECTION

PATENT NO. : 4,061,520

DATED : December 6, 1977

INVENTOR(S) : Andrew M. Cecka & Pol Dano

It is certified that error appears in the above–identified patent and that said Letters Patent are hereby corrected as shown below:

Column 5, line 3, "U.S. Pat. No. 3,479,402" should be-- U.S. Pat. No. 3,579,402 --

Signed and Sealed this

Eleventh Day of July 1978

[SEAL]

Attest:

RUTH C. MASON
Attesting Officer

DONALD W. BANNER
Commissioner of Patents and Trademarks